Patented Jan. 13, 1942

2,270,199

UNITED STATES PATENT OFFICE 2,270,199

GRAPHITE ARTICLE

Richard I. Thrune, Midland, Mich., assignor to The Dow Chemical Company, Midland, Mich., a corporation of Michigan No Drawing. Application January 5, 1940, Serial No. 312,580

12 Claims. (Cl. 106—56)

This application is a continuation-in-part of my co-pending application Serial No. 237,663, filed October 29, 1938.

The present invention relates to an improved binder for graphite and to graphitic pastes comprising the said binder. It relates as well to a method whereby the improved binder may be prepared, and to methods whereby graphitic articles having improved properties may be produced employing the said binder.

In making graphitic articles, it has been the general practice to mix coke and powdered pitch, heat the mixture to melt the pitch, and, by agitation, to distribute the melted pitch around the coke particles. The so-coated coke is compressed or extruded in the desired shape, baked to carbonize the pitch, and heated to graphitizing temperatures, whereby the coke and binder are graphitized.

Owing to the large amounts of electric furnace graphite powder available and to the fact that liquid binders are more easily handled to produce uniformly coated particles than are solid binders, it is highly desirable to produce an improved liquid binder comprising liquid coal tar, capable of binding graphite powder into an easily manipulable paste from which strong baked articles may be formed having properties comparable with those of the best graphite articles of customary manufacture.

A graphite paste has long been desired which would contain powdered electric furnace graphits as the predominant constitutent, and which could be shaped under moderate conditions of temperature and pressure to form substantially pure, hard, fine-grained, dense graphite articles. It has been considered impossible to bind electric furnace graphite dust into substantially wholly graphite articles of the desired hardness. A potential use for such desired paste is as an adhesive to join solid pieces of graphite firmly to one another with a predominantly graphitic bond. No such bond has been produced, and it has long been considered that solid blocks of graphite cannot be securely joined with a graphitic bond. Monolithic graphite surfaces, laid-up by troweling methods, and having good mechanical strength, should be producible from such a paste, but have heretofore been considered unattainable by such methods. An extrudable graphite paste, from which satisfactory graphite electrodes may be made, employing electric furnace graphite powder to replace calcined coke as the chief carbonaceous ingredient, is much to be desired.

The expressions "graphite paste" and "carbon paste" have been applied to a number of compositions which are not predominantly graphitic in nature and which are not adapted to accomplish the desirable ends mentioned above. The so-called graphite pastes heretofore reported have comprised large amounts of carbon, a relatively smaller amount of coal-tar pitch, and, occasionally, small amounts of graphite. Such a composition is only sufficiently plastic to be molded or extruded at elevated temperatures, and then only under high pressures. It is evident that such a paste could not be troweled and that its adhesive and cohesive properties are below those desired in a paste of the preferred type. Carbon pastes, comprising coke and pitch, or coke, tar and pitch, or mixtures of the foregoing with plastic clay, have been prepared, dried, crumbled, and mixed with graphite to produce carbon crucible, electrodes, electrolytic cell bodies, and the like, the carbon-pitch composition acting as a binder for the graphite. To deform such a paste requires high pressures and temperatures, because of the low plasticity of the composition. Furthermore, such carbon pastes, when subjected to oxidizing conditions at high temperatures, leave too much residual ash for some of the more important uses to which graphite-containing articles may be put.

Many shaped articles composed of carbon, graphite, or mixtures of the two, with or without added clay, and with coal-tar pitch as a binder, are commonly employed in contact with molten metals, such as magnesium, aluminum, and their alloys. Magnesium and aluminum are produced by electrolytic methods, employing graphite-containing electrodes. These metals must be as free as possible from contamination by iron and silicon, the oxides of which are present in the residual ash after consumption of the carbon or graphite bodies in contact with the molten metals.

In order to alter controllably the electrical conductivity, the hardness, or other physical properties of a graphitic article, it is desirable on occasion to incorporate into such an article varying amounts of abrasives, hardening agents, metallic powders or filings, or the like. Examples of such addition agents which may produce in the finished produce a desirable effect are carborundum or corundum, metal salts such as calcium fluoride, or metal filings, turnings or powders, such as, for example, those of iron, copper, nickel, or the like. When employing the heretofore customary method of making graphite articles from coke and pitch, it has been impractical, if not entirely impossible, to produce articles containing addition agents such as those just above suggested. This is true because, when a coke-pitch-metal article, for example, is heated to graphitizing temperatures, the metal is evaporated from the article. Hence, if the coke is converted to graphite, the metal is no longer present, and the so-formed product is porous and has high electrical resistance and poor heat conductivity.

It is accordingly among the objects of the present invention to provide an improved liquid binder for electric furnace graphite powder or dust comprising as one of its principal constituents a normally liquid coal tar, i. e. a coal tar which is fluid at room temperature. Another object is to provide such a binder modified by the addition of an agent capable of increasing the coking value of the tar beyond that of the normal carbon content of the said tar.

A further object is to provide a graphite paste composition comprising electric furnace graphite powder and a liquid binder as aforesaid. Yet another object is to provide a graphite paste as aforesaid capable of being shaped under moderate conditions of temperature and pressure to form hard fine-grained, dense graphite articles, the said paste being possessed of adhesive and cohesive properties which render it capable of use, for example, as a cement whereby solid graphite bodies may be joined one to another. A further object of the invention is to provide a graphite paste as aforesaid from which may be produced graphitic electrodes or like shaped articles of high apparent density and of good tensile strength, the said articles consisting essentially of electric furnace graphite powder particles adherently bonded to one another by means of a binder comprising a normally liquid coal tar and a hardening agent therefor.

Yet a further object is to provide a method whereby graphitic articles may be produced from electric furnace graphite powder, the latter constituting either the sole solid material employed, or being admixed with such modifying agents as abrasives, hardening materials, or metal powders, filings, or turnings. A particular object is to provide a method whereby graphite articles may be produced having, through the addition thereto of iron powder, a controllable electrical conductivity and/or controllable magnetic permeability and thermal conductivity. Other objects and advantages will become apparent from the following description.

The binder constituting an essential part of the present invention consists of a normally liquid coal tar, a halogenated compound to function as a hardening agent for the said tar when the binder is heated together with graphite, and as an excipient therefor a small amount, ordinarily from 15 to 40 per cent based on the weight of the said tar, of a volatile organic solvent or thinner. The nature of the tar, the excipient, and of the halogenated hardening agents will be more fully described hereinafter. The amount of excipient or solvent for the tar employed will depend upon the desired consistency of the graphite paste in which the binder forms an essential part. The amount of liquid coal tar present in the binder relative to graphite or graphite-bearing solids in the paste may vary from about 20 to about 35 parts by weight of tar for each 80 to 65 parts correspondingly of graphite or graphite-bearing solids. A preferred ratio for many purposes, as, for example, in the preparation of pastes suitable for making extruded electrodes, is one of about 25 per cent of tar by weight and 75 per cent of graphite. Since the binder contains not only the liquid tar but also an excipient and a hardening agent, the ratio of binder to graphitic solids may vary from about 25 to about 50 parts of binder by weight for each 75 to 50 parts correspondingly of solids and in some instances the amount of binder may be reduced to as little as 12 per cent, and the solids increased to about 88 per cent. The exact proportion of components of the paste to be employed is selected according to the method whereby shape is to be imparted to the paste in the preparation of graphitic articles. To illustrate, somewhat more fluid pastes are required for troweling operations than can be employed when shape is to be imparted by molding or by extrusion methods.

The excipient and hardening agent employed in the binder may be a single halogenated compound, or the desired properties may be contributed to the binder by two or more separate compounds, one acting as an excipient but having no hardening properties, while the other serves primarily to harden and to increase the coking value of the liquid tar. The preferred excipient is a volatile liquid boiling below about 150° C. The hardening agent employed may be a liquid or a solid, and in some instances it may even be a mixture of a liquid and a solid.

I have found that many chlorinated organic liquids and solids and the corresponding brominated compounds react with liquid coal tar when heated. The reaction is accompanied by the evolution of hydrogen halide and, if the so-treated tar is then cooled, it is observed that a pitch-like substance has been formed in amount considerably greater than that of the normal pitch content of the tar employed. It is this type of reaction on which the present invention depends. Many other chlorinated or brominated compounds, whether liquids or solids, do not of themselves react with liquid coal tar in the manner above indicated but, if mixed with a small amount (1 per cent, based on the tar weight, is usually sufficient) of aluminum chloride, bismuth fluoride, or like condensation catalyst of the Friedel-Crafts type, the reaction proceeds as it does in the case of the more reactive halogenated compounds which do not require such catalytic agent. Among the chlorinated compounds which serve as hardening agents for liquid coal tar may be named the following individuals and combinations:

Carbon tetrachloride
Acetylene tetrachloride
Hexachloroethane
Mixed polychloro-ethanes, -propanes and -butanes
Chloranil
Pentachloroethane
Polymeric vinylidene chloride
Tetrachlorohydroquinone
Octachloropropane
Benzene hexachloride
Hexachlorophenol
Pentachlorophenol
Benzotrichloride
Tertiary butyl chloride
Tetrachlorobenzene+AlCl$_3$
Trichloropropane+AlCl$_3$
Tetrachloroethylene+AlCl$_3$
Hexachlorobenzene+AlCl$_3$
Chloroform+AlCl$_3$
Octachlorodiphenyl oxide+AlCl$_3$
Hexachlorodiphenyl oxide+AlCl$_3$
Etheylene chloride+AlCl$_3$
Propylene chloride+AlCl$_3$ The above named halogenated organic compounds are all classifiable into a few distinct types, including halogenated hydrocarbons, both aliphatic and aromatic; halo-phenols and halopolyphenols; halo-cyclic ketones; and halo-aryl ethers. The corresponding brominated compounds, where available, were found to serve as hardening agents in like manner. The compounds shown in conjunction with aluminum chloride, in the foregoing list, were each non-reactive when heated with coal tar in the absence of a Friedel-Crafts catalyst. Aluminum chloride alone functions as a hardening agent for liquid coal tar, but not to the extent that its mixtures with halogenated organic compounds, or the halogenated organic hardening agents alone exercise this function. The foregoing list of compounds and types of compounds is not to be construed as limiting the invention, but is given by way of illustration, rather than definition, of the hardening agents, as many other halogenated compounds are operable for the purpose.

It is noted that many of the hardening agents are liquids miscible with liquid coal tar, and such hardening agents may, if desired, be employed in amount sufficient to thin the tar to the desired consistency. The solid hardening agents of the class suggested are added to the liquid tar along with an excipient which may or may not be a solvent for the hardening agent, and may or may not have hardening properties, itself. Examples of non-hardening excipients are benzene, acetone, ethylene chloride, and tetrachloroethylene. The amount of excipient employed is ordinarily from 15 to 40 per cent of the weight of the tar, as required.

The tar employed is a liquid tar, preferably a liquid coal tar, and it has been found most desirable to employ a coal tar which, while liquid and flowable at room temperature, is still substantially free from the creosote and lighter fractions, since these fractions detract from the coking and binding value of a tar, and hence from the density of the finished article. Tars which have been successfully employed have most often been those having specific gravities in the range from 1.10 to 1.22 at 25° C., and, in the main, they have contained less than 5 per cent of material boiling below 235° C., and ordinarily from 25 to 35 per cent has boiled in the range from 235° to 355° C., under the distillation conditions of A. S. T. M. D246-33. They are liquids having pour points below room temperature.

The graphite which has been found preferable in making the graphite pastes of the present invention, is electric furnace graphite powder, and particularly suitable for many uses is such a powder all of which passes through a 16-mesh screen and at least 33 per cent of which passes through a standard 100-mesh screen. For other uses, assorted particle sizes other than those suggested may be employed, selection being made so as to provide the desired density or conductivity so far as these properties may be controllable through particle size selection. For yet other uses, graphite which will all pass through a 200-mesh screen is desirable.

The graphite paste composition of the present invention, then, may be prepared by mixing together from about 50 to about 88 parts by weight of electric furnace graphite powder and correspondingly from about 50 to about 12 parts of a binder consisting, in turn, of liquid coal tar, hardening agent, and excipient. The amount of excipient is usually in the range from 15 to 40 per cent of the weight of tar. If the excipient is not a hardening agent for tar, then the amount of added hardening agent will usually be in the range from about 1 to 15 (and preferably about 10) per cent of the weight of tar. When the composition has been mixed at room temperature sufficiently to insure approximate uniformity of the graphite paste composition, the paste may be stored in a closed container, to minimize loss of solvent, until the paste is to be used, and if the mixing is sufficiently thorough the freshly prepared paste may be employed in making shaped articles.

A paste, such as that whose preparation is described in the preceding paragraph, may be used for the manufacture of graphite articles in somewhat the following manner: The paste may be "plastered" or "troweled" onto a supporting surface having the contour of the desired article or it may be molded or extruded into an article having the desired shape, while still in the plastic condition and while still containing the volatile solvent constituents of the binder. Alternatively the paste may be pre-hardened by heating to a reaction temperature for a short time, and then molded or extruded. The so-formed shaped article is then baked slowly, preferably with a 10-degree (C.) rise in temperature per hour until the temperature has reached 500° C. and a subsequent rise in temperature not to exceed 25 centigrade degrees per hour until the temperature is 800° C. The said baking is preferably carried out in a protective atmosphere such as natural gas or graphite dust so as to minimize surface oxidation and resulting crumbling of the article during baking. Carbon dusts, such as lampblack, cannot be used as the protective coating, as too much carbon is absorbed, and the product does not have the desired properties. For best results, the product should be baked at about 800° C. for from 5 to 8 hours or more. The process just described carbonizes the binder and forms a hard article of high graphite content, free from other impurities. If, however, an entirely graphite crucible, resistor, or other article is to be prepared from the graphite paste, after the said baking operation has been completed, the temperature of the article should be gradually raised to graphitizing temperature according to standard methods.

When the article to be prepared from the graphite paste is a graphite-lined metal crucible, or the like, the first baking operation carried out in the manner described above may be followed by applying to the once-baked article a further coating of graphite paste to fill cracks, smooth the surface, and thicken the walls, after which the baking operation may be repeated. It is important to note that the present graphite paste adheres readily to previously formed graphite surfaces, and makes possible a method of building up graphite surfaces, layer on layer, as desired. When the process is thus repeated, the finished article will have a smoother surface and be freer from minute cracks or pores than was the article after a single baking. It is not necessary to conduct subsequent baking operations as slowly as the first and it has been found that a 10-degree (C.) rise per hour to 150° C. followed by a 25-degree (C.) rise per hour to 500° C. and a 50-degree (C.) rise per hour to 800° C. is satisfactory. When preparing graphite crucibles in this manner, it is occasionally found that the graphite paste adheres to the steel crucible mold during the baking operation. This may be avoided readily by lining the mold, for example, with a sheet of paper which will be destroyed during the baking operation, leaving a minute space between the crucible and the mold.

Articles so prepared, whether the binder is carbonized or graphitized, are found to be substantially free from impurities which characterize otherwise similar articles produced by the heretofore known methods. The coke-oven tar, which is completely soluble in organic solvents leaves only a negligible quantity of ash when oxidized. Since the predominant part of the carbon present in both the raw and baked article is in the form of graphite, it may readily be seen that the overall amount of impurities in such an article is substantially less than in those prepared from coke and pitch, or from coke, pitch, and graphite.

It has also been found that shaped articles may be prepared from a paste of the kind above described, wherein some of the graphite is replaced by abrasives, such as carborundum, or metal particles such as iron or copper powder, and the like, to provide articles of controlled hardness, or articles which can be made to comply with any of a wide range of specifications as to their magnetic, electrical, or thermal properties.

The following examples illustrate the practice of the invention, but are not to be construed as limiting the same:

EXAMPLE I.—*Preparation of binder*

Several liquid substantially creosote-free coke-oven coal-tars, satisfactory for use in the preparation of binders, had the following approximate characteristics:

*Tar*

| | |
|---|---|
| Specific gravity at 25° C | 1.17–1.22 |
| Flash point, °F | 175–200 |
| Fire point, °F | 215–250 |
| Viscosity, Saybolt, at 200° F | 60–100 |
| Conradson carbon per cent | 22–30 |
| Boiling range, A. S. T. M. D246-33: | Per cent |
| To 210° C | 0–1.2 |
| 210°–235° C | 0.5–4.8 |
| 235°–270° C | 7.0–11 |
| 270°–315° C | 7.0–10 |
| 315°–355° C | 7.5–11 |
| Residue above 355° C | 62–78 |

To each of several portions of tars conforming approximately to the foregoing specifications, is added an excipient and a hardening agent, as shown in the following table. Samples of the so-formed liquid binders, when heated to 150°–160° C. for about 30 minutes, and cooled, harden to pitch-like consistency with an accompanying loss in weight considerably less than that obtained when volatile materials are distilled from tars to leave a similar pitch. The average weight of the test samples after these hardening tests is about 92 per cent of the original tar weight. Since there is only about 62–78 per cent of pitch in the original untreated tar, considerable advantage is obtained through the hardening procedure herein described.

TABLE

*Binder compositions*

| Liquid tar, percent | Hardening agent | | Excipient | |
|---|---|---|---|---|
| | Kind | Percent | Kind | Percent |
| 85 | Carbon tetrachloride | 15 | Same* | |
| 90 | Acetylene tetrachloride | 10 | Same | |
| 80 | Hexachloroethane | 10 | Benzene | 10 |
| 63.5 | Chloranil | 9.3 | Benzene | 27.2 |
| 90 | Pentachloroethane | 10 | Same | |
| 65 | Polymeric vinylidene chloride | 10 | Benzene | 25 |
| 70 | Tetrachlorohydroquinone | 10 | Acetone | 20 |
| 77 | Octachloropropane | 8 | Ethylene chloride | 15 |
| 70 | Benzene hexachloride | 10 | Benzene | 20 |
| 65 | Hexachlorophenol | 10 | Benzene | 25 |
| 70 | Pentachlorophenol | 10 | Benzene | 20 |
| 75 | Benzotrichloride | 5 | Toluene | 20 |
| 80 | Tertiary-butyl chloride | 10 | Ethylene chloride | 10 |
| 75 | Tetrachlorobenzene+AlCl$_3$** | 10 | Benzene | 15 |
| 80 | Trichloropropane+AlCl$_3$ | 20 | Same | |
| 75 | Tetrachloroethylene+AlCl$_3$ | 25 | Same | |
| 77 | Hexachlorobenzene+AlCl$_3$ | 8 | Benzene | 15 |
| 80 | Chloroform+AlCl$_3$ | 20 | Same | |
| 65 | Octachlorodiphenyl oxide + AlCl$_3$ | 10 | Ethylene chloride | 25 |
| 70 | Hexachlorodiphenyl oxide + AlCl$_3$ | 8 | Ethylene chloride | 22 |
| 75 | Ethylene chloride+AlCl$_3$ | 25 | Same | |
| 75 | Propylene chloride+AlCl$_3$ | 25 | Same | |

*"Same" indicates that the liquid hardening agent was present in amount sufficient to serve as excipient.
**When AlCl$_3$ was used it was present in amount equal to 1 percent of the weight of tar. This is included in the value given for percent of hardening agent.

It is to be understood that the foregoing binder compositions are illustrative only, and that the amount of excipient present may vary beyond the limits indicated in the table, to provide the desired consistency in the graphite paste, as hereinafter illustrated. Further, the binders will become hardened to pitch-like consistency when subjected to temperatures other than the 150°–160° C. suggested above, lower temperatures usually requiring longer periods than the suggested half hour, and higher temperatures being effective in somewhat shorter time. Even at room temperature and in a closed container, substantial hardening may occur in a month.

EXAMPLE II.—*Preparation of graphite paste*

A. To 40 parts by weight of a binder prepared according to the method of Example I, and containing carbon tetrachloride as the excipient, was added 60 parts by weight of electric furnace graphite powder, all of which passed through a 100-mesh screen, and 85 per cent of which passed through a 200-mesh screen. The graphite and binder were thoroughly mixed by stirring, forming a smooth, paste-like composition, which was uniform to all appearances. The paste was allowed to stand a few hours to insure complete and uniform wetting of all graphite particles with the binder composition. When the paste is to be used for making molded or extruded articles, a small amount (2–5 per cent) of lubricating oil may be added to prevent sticking during the shaping operation.

B. In similar manner, other pastes were prepared employing various of the binder compositions of Example I. Owing to the differences in density of the various excipients used in the binder composition, the same weight proportion of binder and graphite could not be used in each case. Enough electric furnace graphite powder was added to give the desired working consistency. The proportions by weight usually vary from about 25 to 50 parts of binder for each 75 to 50 parts of graphite in a satisfactory paste.

C. To prepare a paste which after baking is still more resistant to wear and abrasion, as well as being resistant to oxidation when exposed to air at elevated temperatures, a surface-hardening and anti-oxidant agent is added. Suitable agents are metal salts, such as the halides and carbides, e. g. calcium fluoride or silicon carbide. A suitable mixture consists of 40 parts of powdered graphite, 30 parts of powdered calcium fluoride or silicon carbide, and 30 parts by weight of a liquid binder as described in Example I. Another similar mixture consists of 50 parts of powdered graphite, 10 parts of powdered calcium fluoride, and 40 parts of the binder by weight.

EXAMPLE III.—*Making shaped articles from the paste*

A. *Crucible-pot linings.*—A cast steel melting pot was sandblasted to clean the inner surface. A coating 0.75 inch thick, consisting of the paste composition of Example II—A, was troweled onto the inner wall of the pot, which was then slowly baked in an inert atmosphere. Until the temperature reached 500° C., the heating rate was only 10 degrees per hour. Thereafter the rate was kept below 25 degrees per hour until 800° C. was attained. The latter temperature was maintained for about 10 hours. The crucible was cooled slowly, and a second coating of graphite paste was applied to increase the thickness of the coat to about 1 inch, and to fill check-cracks formed as a result of shrinkage during the first baking. The lined crucible was again baked, the temperature being increased 10 degrees per hour to 200° C., 25 degrees per hour to above 500° C., and about 50 degrees per hour to 800° C., which temperature was maintained for 5 to 6 hours. A continuous, monolithic lining was thus produced which was impervious to molten metal.

B. *Molded articles.*—A graphite paste, as described in Example II—A, is pressed into a mold having the desired shape. Only sufficient pressure is applied to insure that the mold is substantially filled with paste and free from air bubbles. The article is removed from the mold, and baked in the manner described in Example III—A. For most purposes, baking at 800° C. is sufficient to produce a predominantly graphite article wherein the binder is well carbonized. When it is desired to make graphite resistors, and the like, baking is carried out in a regular graphite furnace. This paste has been employed to form a graphite crucible which was used as the hearth of an electric arc furnace. As the crucible was being formed, an electrode was imbedded in the paste. The electric arc was made between the imbedded electrode and another electrode inserted through the cover of the furnace. The crucible conducted the current, was not attacked by the molten material it contained, and stood up well under operating temperatures of about 2000° C.

C. *Same.*—In making molded articles from the graphite pastes of the present invention, it has been found that the hardening of the tars may be effected as described in the immediately preceding example, or the tar in the paste may be pre-hardened prior to the shaping operation. As an example of this practice, a paste consisting of 28.5 per cent of binder and 71.4 per cent of graded electric furnace graphite powder was prepared. The binder in this particular example consisted of 85 per cent of liquid coal tar having the general specifications given above and 15 per cent of carbon tetrachloride to serve as hardening agent and excipient. The paste was thoroughly mixed and heated while mixing to a temperature of 100° to 110° C. for about 6 to 8 minutes to initiate the hardening reaction and to permit escape of components volatile at that temperature. The pre-heated paste was then rapidly cooled and was found to have been partially hardened by the heat treatment. The graphite particles thus became coated with a pitch-like material which was soft enough in consistency to have considerable adhesion when pressure was applied to an aggregate of the said particles. The batch of paste was placed in a mold of the desired shape and pressure was applied to compact the same. When pressure was released, the molded article had a good "green" strength and was then subjected to a baking operation to volatilize any remaining excipient and eventually to carbonize the binder. In this manner, predominantly graphitic crucibles of good strength and high density have been prepared.

D. *Extruded articles.*—Owing to the plastic nature of the graphite paste, it is readily extruded in known manner to form shaped articles of uniform cross-section. It has been found particularly advantageous in preparing shaped articles, especially in the extrusion of graphite electrodes, to subject a graphite paste to the preliminary hardening treatment described in Example III—C just above. For extrusion operations, a longer heat treatment or one at considerably higher temperatures than those given in Example III—C should be employed. Thus to provide a graphite paste pre-hardened to an extent such that the binder has approximately the same adhesion characteristics and softening point as does the pitch employed in the customary coke-pitch extrusion mixes, the preheating should be carried out at a temperature suitably near 150° C. Thus a liquid tar, excipient, hardening agent and graphite are mixed to form a paste, preheated while still mixing to a hardening temperature, suitably near 150° C., cooled to form a mass of discrete solid particles, and then extruded under pressure and suitably with the application of heat to form shaped articles of sufficiently high "green" strength to permit their being handled and transported from the extrusion press to a furnace wherein they may be baked to carbonize the binder and, if desired, heated to more elevated temperatures to effect a graphitization of the carbonized binder. When operating according to this practice, shaped graphite articles have been prepared having high density and low electrical resistance. These articles have been comparable in these regards with the best commercial graphitic articles of like size and shape heretofore available. Their preparation has been simplified as compared with standard practice through the use of a liquid binder and the economy of the process is of especial importance because of the ease with which the electric furnace graphite powder is employed in making shaped articles. Such powder has heretofore been deemed waste. Graphite rods, electrodes, tubes, bars, channels, and the like, can be formed by extrusion of the pastes herein described, and heating the so-extruded shaped articles.

EXAMPLE IV.—*Patching and joining graphite articles with the paste*

A. A graphite trough, intended for use as a flume for carrying molten metal, was prepared from a series of open graphite channels of semicircular cross-section. The individual channel members were placed in a supporting steel frame, and the cracks between consecutive members were troweled full of the graphite paste of Example II—A. The trough was baked, sealing the joints, and was put into service. After several months' operation, it was still in good condition at the joints.

B. A commercial graphite tube developed a sizeable hole due to strain at one point on its curved surface. The tube was expensive, and to secure a replacement tube of like dimensions would require several days. A metal sleeve was inserted into the broken tube and positioned opposite the fracture, which was then filled with graphite paste, dried, and baked. The exterior of the patch was abraded to conform to the contour of the original article, the sleeve was removed, and the tube returned to service. The repair was inexpensive and required less than 48 hours, including the baking. The repaired tube has stood up well under service.

EXAMPLE V.—*Making articles from a graphite paste and coke*

Part of the graphite in the pastes employed in Example III may be replaced by finely divided petroleum coke or finely divided foundry coke. Thus, if the solids in a graphite paste are made up in part of a coke which will pass a 20-mesh screen, the remainder of the solids being graphite varying in size from approximately 40-mesh to 200-mesh or finer, strong shaped articles can be made either by molding or extrusion operations as described in Example III. In such instances it is advantageous to employ, as an additional component of the paste, from 2 to 5 per cent or more of a petroleum oil to serve as a lubricant. This is made desirable because of the abrasive characteristics of coke as compared with graphite. In general, articles prepared from a coke-graphite paste should be heated to a temperature sufficiently high to graphitize the coke if low electrical resistance is a desired attribute of the so-formed article.

EXAMPLE VI.—*Making articles from graphite pastes containing metals*

For some purposes, it is desirable to alter the electrical conductivity, magnetic permeability and thermal properties of graphitic articles while retaining many of the desirable characteristics of graphite as a property of the modified product. In order to accomplish this end, one means which has been found includes the incorporation in a graphite paste of a metal powder either as a supplement to the graphite in one of the described pastes, or as a substitute for part of the graphite. To illustrate this aspect of the invention, reference will now be made to the preparation of graphitic articles containing metallic iron. In the following table, the compositions reported contain as the binder a mixture of 85 parts by weight of liquid coal tar and 15 parts by weight of carbon tetrachloride to serve both as hardening agent and excipient. The binder was mixed with a powder consisting of 200-mesh graphite and fine iron filings, 30 per cent of which passed through a 200-mesh screen. The proportion of iron to graphite in the powder and the proportion of powder to binder is given in each instance in the table. The pastes obtained were mixed with 3 per cent of their weight of oil to serve as a lubricant and were then heat-treated by subjecting them to a preliminary hardening operation at 100° to 140° C. for from 5 to 10 minutes. While still hot, the so-formed pastes were pressed into desired shapes in a mold which was then cooled, the green article removed and baked at a temperature of 900° to 950° C. for about 2 hours to carbonize the binder. Electrical measurements were made on the baked test pieces and the values obtained are reported in the table:

| Paste composition | | Powder composition | | Resistance |
|---|---|---|---|---|
| Powder | Binder | Iron | Graphite | |
| | | | | *Ohm per centimeter cube* |
| 60 | 40 | 10 | 90 | .0006215 |
| 61 | 39 | 25 | 75 | |
| 62 | 38 | 35 | 65 | |
| 70 | 30 | 50 | 50 | .0005725 |
| 80 | 20 | 65 | 35 | .000478 |
| 80 | 20 | 75 | 25 | |
| 87.2 | 12.8 | 90 | 10 | .0002675 |

Thus, it is observed that graphitic articles may be prepared from pastes made according to the present invention containing powdered iron in widely varying proportions to produce articles of considerably modified electrical properties. Other properties of the articles vary in like manner.

B. In a manner similar to that described in Example VI—A above, graphitic articles containing powdered copper have been produced. The binder in this instance was the same as that employed in the graphite-iron compositions described above, and the copper was of approximately 200-mesh average particle size. A paste composition consisting of 65.5 per cent powder and 34.5 per cent binder and wherein the powder consisted of equal weights of 200-mesh copper and 200-mesh graphitized foundry coke was prepared, prehardened, molded, the molding baked to carbonize the binder, and the electrical resistance determined to be 0.000469 ohm per centimeter cube.

It is to be understood in preparing the pastes herein described, that no particular sequence of operations in mixing the components is required. For example, if the halogenated hardening compound is a solid, it may be mixed with the graphite powder, and this dry mix then stirred into the binder, which contains liquid tar and excipient. Alternatively, the hardening agent, whether liquid or solid, may be put into the tar, the mixture stirred with the desired amount of graphite, and the excipient added to obtain a paste of the desired workable consistency. Similarly, the hardening agent, liquid tar, and excipient may be mixed, as suggested in the foregoing examples, and a graphite-containing powder added.

Other modes of applying the principle of my invention may be employed rather than those explained, change being made as regards the method or materials herein disclosed, provided the steps or materials stated by any of the following claims, or the equivalent of such stated steps or materials be employed or obtained.

I therefore particularly point out and distinctly claim as my invention:

1. A graphite paste composition comprising, in plastic proportions, (1) a liquid binder containing a normally liquid coal tar and a hardening agent therefor containing a halogenated organic compound, said hardening agent being reactive with the tar at elevated temperatures, and (2) a powder containing electric furnace graphite.

2. A graphite paste composition comprising (1) from 12 to 50 per cent of a binder containing a normally liquid coal tar and a hardening agent therefor containing a chlorinated organic compound, said hardening agent being reactive with the tar at elevated temperatures, and (2) correspondingly from 88 to 50 per cent of a powder containing electric furnace graphite.

3. A graphite paste composition comprising (1) from 12 to 50 per cent of a binder containing normally liquid coal tar, a volatile organic compound as an excipient for the paste and a hardening agent therefor containing a chlorinated organic compound, said hardening agent being reactive with the tar at elevated temperatures, and (2) correspondingly from 88 to 50 per cent of a powder containing electric furnace graphite.

4. A graphite paste composition comprising (1) from 12 to 50 per cent of a binder containing normally liquid coal tar, a volatile organic compound as an excipient for the paste and a hardening agent therefor containing a chlorinated organic compound, said hardening agent being reactive with the tar at elevated temperatures, and (2) correspondingly from 88 to 50 per cent of a powder containing electric furnace graphite and a finely divided metal.

5. A graphite paste composition comprising (1) from 12 to 50 per cent of a binder containing normally liquid coal tar, a volatile organic compound as an excipient for the paste and a hardening agent therefor containing a chlorinated organic compound, said hardening agent being reactive with the tar at elevated temperatures, and (2) correspondingly from 88 to 50 per cent of a powder containing electric furnace griphite and finely divided iron.

6. The paste composition claimed in claim 3, wherein the hardening agent and excipient is carbon tetrachloride.

7. The method which comprises providing a graphite paste as claimed in claim 1, shaping an article from the said paste, and baking the article to carbonize the binder.

8. The method which comprises providing a graphite paste as claimed in claim 1, heating the paste to effect a preliminary partial hardening of the binder, shaping an article from the so-treated paste, and baking the article to carbonize the binder.

9. The method which comprises mixing together from 88 to 50 per cent of a powder containing electric furnace graphite powder and correspondingly from 12 to 50 per cent of a liquid binder therefor, said binder containing a normally liquid coal tar, from 15 to 40 per cent, based on the weight of tar, of a volatile excipient for the paste, and about 10 per cent, based on the tar weight, of a chlorinated organic compound reactive in the paste at elevated temperatures to harden the tar therein, shaping an article from the so-formed paste, and baking the article to carbonize the binder.

10. The method which comprises mixing together from 88 to 50 per cent of a powder containing electric furnace graphite powder and correspondingly from 12 to 50 per cent of a liquid binder therefor, said binder containing a normally liquid coal tar, from 15 to 40 per cent, based on the weight of tar, of a volatile excipient for the paste, and about 10 per cent, based on the tar weight, of a chlorinated organic compound reactive in the paste at elevated temperatures to harden the tar therein, heating the paste to effect a preliminary partial hardening of the binder, shaping an article from the so-treated paste, and baking the article to carbonize the binder.

11. The method which comprises providing a graphite paste as claimed in claim 4, heating the paste to effect a preliminary partial hardening of the binder, shaping an article from the so-treated paste, and baking the article to carbonize the binder.

12. The method which comprises providing a graphite paste as claimed in claim 5, heating the paste to effect a preliminary partial hardening of the binder, shaping an article from the so-treated paste, and baking the article to carbonize the binder.

RICHARD I. THRUNE.